(12) United States Patent  (10) Patent No.: US 8,395,587 B2
Cauwels et al.  (45) Date of Patent: Mar. 12, 2013

(54) HAPTIC RESPONSE APPARATUS FOR AN ELECTRONIC DEVICE

(75) Inventors: Patrick Cauwels, South Beloit, IL (US); Rachid Alameh, Crystal Lake, IL (US); Thomas Gitzinger, Libertyville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1185 days.

(21) Appl. No.: 12/038,279

(22) Filed: Feb. 27, 2008

(65) Prior Publication Data

US 2009/0160763 A1    Jun. 25, 2009

Related U.S. Application Data

(60) Provisional application No. 61/016,111, filed on Dec. 21, 2007.

(51) Int. Cl.
*G09G 5/00* (2006.01)

(52) U.S. Cl. ..... 345/173; 345/174; 361/600; 455/550.1; 327/517; 310/339

(58) Field of Classification Search ............. 345/156, 345/170; 310/339
See application file for complete search history.

(56) References Cited

U.S. PATENT DOCUMENTS

| | | | |
|---|---|---|---|
| 5,646,589 A | 7/1997 | Murray et al. | |
| 5,973,441 A * | 10/1999 | Lo et al. | 310/330 |
| 6,389,302 B1 | 5/2002 | Vance | |
| 6,490,360 B2 | 12/2002 | Corsaro | |
| 6,703,764 B2 * | 3/2004 | Lee et al. | 310/328 |
| 6,819,316 B2 * | 11/2004 | Schulz et al. | 345/174 |
| 6,963,762 B2 | 11/2005 | Kaaresoja et al. | |
| 7,089,793 B2 | 8/2006 | Yokoi et al. | |
| 7,098,897 B2 * | 8/2006 | Vakil et al. | 345/173 |
| 7,216,962 B2 | 5/2007 | Miyazawa et al. | |
| 7,265,562 B2 * | 9/2007 | Chen et al. | 324/755.07 |
| 8,036,699 B2 | 10/2011 | Araki | |
| 2003/0067449 A1 | 4/2003 | Yoshikawa et al. | |
| 2003/0146673 A1 * | 8/2003 | Toda et al. | 310/313 D |
| 2004/0021663 A1 | 2/2004 | Suzuki | |
| 2005/0007342 A1 * | 1/2005 | Cruz-Hernandez et al. | 345/161 |
| 2005/0032559 A1 | 2/2005 | Sudo et al. | |
| 2005/0057528 A1 * | 3/2005 | Kleen | 345/173 |

(Continued)

FOREIGN PATENT DOCUMENTS

| | | |
|---|---|---|
| KR | 1020050038645 A | 4/2005 |
| WO | 9948083 A1 | 9/1999 |

(Continued)

OTHER PUBLICATIONS

KIPO Notice of Preliminary Rejection (English Translation), Dec. 13, 2011, all pages.

*Primary Examiner* — Grant Sitta

(57) ABSTRACT

A user input for an electronic device includes a haptic feedback layer (100) and a touch sensitive user interface (200). The haptic feedback layer (100) provides a tactile response to a user when the user actuates a user actuation target (301) on the touch sensitive user interface (200) to simulate a popple-style button. The haptic feedback layer (100) includes a chassis (101) and a plurality of oppositely facing, interlaced cantilever beams (105,106) emanating therefrom, further separated by a support beam (113), and spanning at least a portion of the haptic feedback layer (100). One or more piezoelectric actuators (119) are coupled to the cantilever beams and are responsive to a controller (201). When the controller detects user actuation of the touch sensitive user interface (200), the controller (201) causes at least one of the piezoelectric actuators to actuate in accordance with an actuation signal.

20 Claims, 9 Drawing Sheets

U.S. PATENT DOCUMENTS

| | | |
|---|---|---|
| 2005/0208903 A1 | 9/2005 | Sakamoto |
| 2005/0219372 A1 | 10/2005 | Watanabe |
| 2005/0253643 A1 | 11/2005 | Inokawa et al. |
| 2006/0052143 A9* | 3/2006 | Tuovinen .................. 455/575.1 |
| 2006/0172706 A1 | 8/2006 | Griffin et al. |
| 2006/0187215 A1 | 8/2006 | Rosenberg et al. |
| 2006/0208614 A1 | 9/2006 | Scher et al. |
| 2007/0037605 A1 | 2/2007 | Logan |
| 2007/0066274 A1 | 3/2007 | Kim |
| 2007/0103449 A1 | 5/2007 | Laitinen et al. |
| 2008/0100568 A1* | 5/2008 | Koch et al. .................... 345/156 |
| 2008/0207254 A1* | 8/2008 | Pierce et al. ............... 455/550.1 |
| 2009/0072768 A1 | 3/2009 | Murray et al. |

FOREIGN PATENT DOCUMENTS

| | | |
|---|---|---|
| WO | 03103065 A1 | 12/2003 |

* cited by examiner

HAPTIC RESPONSE APPARATUS FOR AN ELECTRONIC DEVICE

CROSS REFERENCE TO PRIOR APPLICATIONS

This application claims priority and benefit under 35 U.S.C. §119(e) from U.S. Provisional Application No. 61/016,111, filed Dec. 21, 2007, which is incorporated by reference for all purposes.

BACKGROUND

1. Technical Field

This invention relates generally to portable electronic devices, and more particularly to a portable electronic device having a user interface that provides an active haptic feedback to a user in response to the user interfacing with an actuation target on the user interface.

2. Background Art

Portable electronic devices, such as mobile telephones, personal digital assistants, and media players, are becoming more sophisticated. Designers of these devices are incorporating more features and applications into each new generation of these products. It is not uncommon today, for example, to find a mobile telephone that includes an on-board camera for video and pictures, a music application for playing songs, a calendar application for storing reminders, and an address book capable of storing hundreds of contacts.

Just as the applications associated with these devices are becoming more advanced, so too are the user interfaces. While many mobile devices have user interfaces that include an array of "popple" style buttons, more and more devices are being equipped with touch sensitive screens. With a touch sensitive user interface, a user simply touches a rigid piece of plastic or glass rather than depressing a button. Capacitive, resistive, or other sensors detect the presence of the user's finger or stylus.

One problem associated with these devices is that it is sometimes difficult for a user to know whether they actually pressed the "virtual button" that they intended to press. With a popple-style keyboard, a user easily knows whether a button has been pressed because they can feel the "click type" response of the button going into, and out of, the user interface. Further, they can hear the "click" sound that the popple makes. When using a touch sensitive interface, however, there is no physical deflection to feel. The user merely places a finger or stylus on a piece of glass. Further, there is generally no sound when a finger touches a piece of glass. Consequently, the user may be unsure whether the virtual button has actually been actuated.

Some device manufacturers have tried to remedy this problem by adding a faux popple sound. When the capacitive or other sensor detects that a virtual button has been actuated, the device is programmed to broadcast a "click" sound from an on-board loudspeaker. This solution is less than ideal, however, as there are many environments in which sounds are either not permitted or are distracting. In meetings, theaters, and other similar places a user may not desire a speaker popping each time the user touches the touch sensitive interface.

There is thus a need for an improved user feedback in an electronic device employing a touch sensitive or similar user interface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
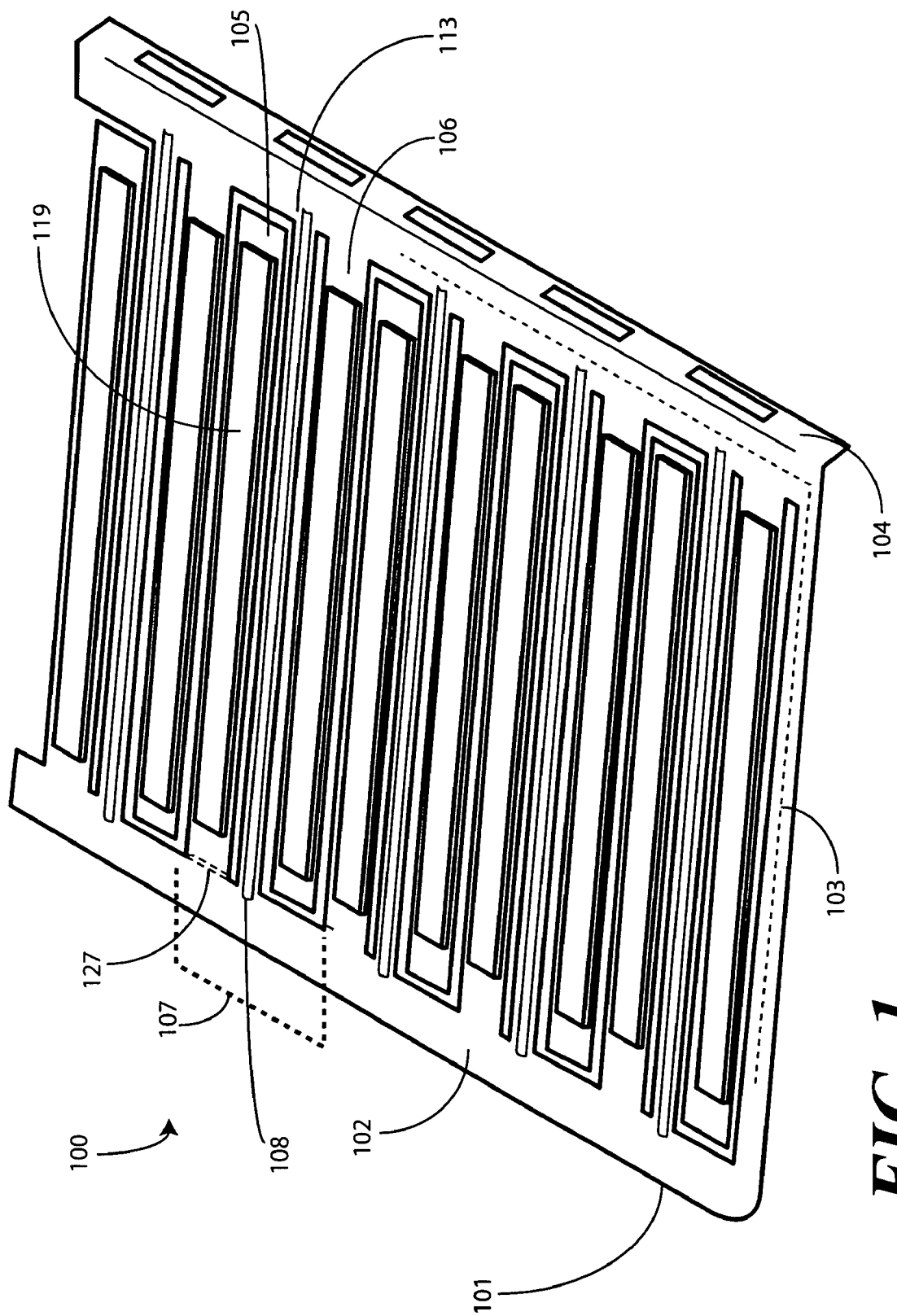
FIG. 1 illustrates one embodiment of a haptic feedback platform in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Further, it is expected that one of ordinary skill, notwithstanding possibly significant effort and many design choices motivated by, for example, available time, current technology, and economic considerations, when guided by the concepts and principles disclosed herein will be readily capable of generating one or more embodiments of the invention with minimal experimentation. Also, reference designators shown herein in parenthesis indicate components shown in a figure other than the one in discussion. For example, talking about a device (10) while discussing figure A would refer to an element, 10, shown in figure other than figure A.

Embodiments of the present invention employ a haptic response system in electronic devices having touch sensitive displays. By way of example, copending, commonly assigned U.S. application Ser. No. 11/684,454, entitled "Multimodal Adaptive User Interface for a Portable Electronic Device," which is incorporated herein by reference, teaches a morphing user interface that is configured to dynamically present a mode-based set of user actuation targets on a user interface.

Each of these user actuation targets is a "virtual key" in that no popple-style button corresponds to the user actuation target. To the contrary, the user interface is a smooth, generally rigid fascia member that uses a capacitive sensor layer to detect contact of a finger or stylus with the user interface. In the '454 application, as there are no physical buttons, a haptic layer of one or more piezoelectric transducers on a metal plate was provided. While this configuration works well in practice, embodiments of the present invention provide an alternate haptic layer assembly that provides a more generalized haptic response across the entirety of the user interface.

Embodiments of the present invention include a chassis having a plurality of oppositely facing, interlaced cantilever beams in conjunction with strip piezoelectric transducers to provide a uniform, smooth haptic response across the surface of the user interface. Further, in some embodiments of the present invention the cantilever beams can be actuated in synchronous or asynchronous groups to provide a haptic response that is tailored to a particular application.

When using piezoelectric strips or elements to provide a haptic response, challenges sometimes arise regarding structural support and dampening. Designers sometimes desire a haptic response that is strong and uniform across the user interface. In such instances, issues relating to how to minimize structural dampening can be challenging to resolve. Embodiments of the present invention work to resolve these issues to provide a smooth and uniform haptic response.

If a particular haptic response in an electronic device is too weak to be perceived by the user, or if the haptic response lacks the required uniformity to match the particular application, the tactile feedback can become compromised or moot. Such inferior haptic response systems can even degrade system performance, as they effectively waste processing power and energy. Embodiments of the present invention work to ensure a crisp, uniform haptic response that provides the user with a distinct tactile sensation without wasting these resources that can be so precious in portable electronic devices.

Embodiments of the invention include an interleaving piezoelectric structure having complementary, oppositely facing, interlaced, separate cantilever beams emanating from opposing directions. These beams—operating with strip piezoelectric transducers coupled thereto—create a balanced drive response for the user. In one embodiment, the beams are separated by a cross member, which may be formed to include an arch or other support shape. The cross members provide system rigidity. They also function to isolate the cantilever beams from outside dampening and external influence. The cross member chassis also enables the overall structure to remain substantially rigid, and to resist an effective load (such as a finger or stylus pressing on the user interface) while prohibiting this load from dampening the characteristic response of the piezo-elements. Further, the structure prevents the cantilever beams from constraint from the other layers of the system, including pinching or binding.

Within this geometric chassis structure, an array of strip piezoelectric elements are mounted on the beams. The structure and piezoelectric elements work in a complementary manner leading to a uniform or averaged response over the active region of the structure.

Turning now to FIG. 1, illustrated therein is one embodiment of a haptic feedback layer 100 in accordance with embodiments of the invention. The haptic feedback layer 100 is suitable for mounting beneath a touch sensitive user interface as will be described with respect to FIG. 2.

The haptic feedback layer 100 includes a chassis 101. The chassis 101, which may be manufactured from thin, spring steel or other similar metals or plastics, has a planar member 102 that defines a perimeter 103 of the chassis 101. The planar member 102 provides an outer support structure for the chassis 101. The chassis 101, in one embodiment, also includes an optional connecting member 104 for coupling the haptic feedback layer 100 to the housing or other structures within an electronic device.

The haptic feedback layer 100 includes a plurality of oppositely facing, interlaced cantilever beams. Beam 105 and beam 106 serve as illustrative beams for FIG. 1. While other beams appear in FIG. 1, beams 105,106 will be used for discussion to illustrate properties and characteristics exhibited by each of the beams. Further, it will be obvious to those of ordinary skill in the art having the benefit of this disclosure that any number of beams may be used in accordance with the present invention.

The beams 105,106 emanate from the perimeter 103 of the chassis 101 and span across at least a portion of the haptic feedback layer 100. In the exemplary embodiment of FIG. 1, the plurality of oppositely facing, interlaced cantilever beams 105,106 span substantially the entirety of the haptic feedback layer. Each cantilever beam, e.g. cantilever beam 105, is interlaced with an oppositely facing cantilever beam, e.g. cantilever beam 106. The plurality of oppositely facing, interlaced cantilever beams 105,106 can be grouped in sets. For instance, in the exemplary embodiment of FIG. 1, the plurality of oppositely facing, interlaced cantilever beams 105,106 are grouped in pairs, e.g. pair 107, and span horizontally across the haptic feedback layer 100. Where the haptic feedback layer 100 is disposed beneath a touch sensitive user interface, the plurality of oppositely facing, interlaced cantilever beams 105,106 can be configured to span across the touch sensitive user interface.

In one embodiment, the chassis 101 of the haptic feedback layer 100 further comprises one or more support beams, e.g. support beam 113, that span the chassis 101. While other support beams appear in FIG. 1, support beam 113 will be used for discussion to illustrate properties and characteristics exhibited by each of the support beams. Further, it will be obvious to those of ordinary skill in the art having the benefit of this disclosure that any number of support beams may be used in accordance with the present invention.

As noted above, the one or more support beams 113 provide structural integrity to the chassis as well as providing freedom of movement to the plurality of oppositely facing, interlaced cantilever beams 105,106. In the exemplary embodiment of FIG. 1, as the plurality of oppositely facing, interlaced cantilever beams 105,106 are grouped in pairs, e.g. pair 107, each pair of oppositely facing, interlaced cantilever beams 105,106 is separated by a support beam. By way of example, the pair 107 of cantilever beams 105,106 is separated by support beam 113.

In one embodiment, each of the one or more support beams 113 can include a structural cross section shape. In the exemplary embodiment of FIG. 1, each of the one or more support beams 113 includes an arch, e.g. arch 108, that spans at least a portion of its cross section. In addition to providing extra structural integrity, in the embodiment of FIG. 1 the arch 108 is formed so as to be about twice the thickness of the piezoelectric transducer that will be coupled to the surrounding cantilever beams. This height helps to ensure that the plurality of oppositely facing, interlaced cantilever beams 105,106 will have freedom to operate when other layers are disposed atop the haptic feedback layer 100. Note that in the exemplary embodiment of FIG. 1, the arches 108 span roughly half the width of the one or more support beams 113.

One or more piezoelectric actuators, e.g, piezoelectric actuator 119, are coupled to the plurality of oppositely facing, interlaced cantilever beams 105,106. Note that while other piezoelectric actuators appear in FIG. 1, piezoelectric actuator 119 will be used for discussion to illustrate properties and characteristics exhibited by each of the piezoelectric actuators. Further, it will be obvious to those of ordinary skill in the art having the benefit of this disclosure that one or more piezoelectric actuators may be used in accordance with the present invention.

In the exemplary embodiment of FIG. 1, the piezoelectric actuators 119 are coupled to the plurality of oppositely facing, interlaced cantilever beams 105,106 on a one-to-one basis. However, each of the plurality of oppositely facing, interlaced cantilever beams 105,106 may include more than one piezoelectric actuator.

In one embodiment, the one or more piezoelectric actuators 119 are disposed upon and are bonded to the plurality of oppositely facing, interlaced cantilever beams 105,106. Examples of bonding techniques include adhesive, adhesive tape, epoxies, and glue. This direct placement provides a "flex-tensional" bending movement of each of the plurality of oppositely facing, interlaced cantilever beams 105,106. Further, this placement helps to facilitate a true "keyclick" like tactile feedback to a user, as each of the plurality of oppositely facing, interlaced cantilever beams 105,106 includes a low displacement of about 10 to 30 micrometers. Further, adhesive bonding provides a reliable mechanical connection that is both low cost and simple to manufacture.

The one or more piezoelectric actuators 119 generally are individually capable of delivering a fast, e.g., 1.0 to 10.0 milliseconds, high acceleration, e.g., 1-100 g, response needed to simulate key click responses. Piezoelectric actuators are also able to provide a broadband movement (1-2000 Hz) as opposed to fixed frequency response of electromagnetic vibration motors.

The one or more piezoelectric actuators 119 shrink or expand in the lateral direction when subject to an electric field, causing an amplified perpendicular movement in its center with the constraint from being bonded to a hard surface, such as the plurality of oppositely facing, interlaced cantilever beams 105,106. The one or more piezoelectric actuators 119 therefore generate a click-like acceleration curve and sensation when driven by a square wave. Under a sinusoidal driving voltage, the actuators can generate displacement that falls into the comfort zone for vibrotactile feedback. Piezoelectric actuators can also be operated in a wide frequency range, allowing broadband haptic responses. Power consumption of piezoelectric actuators is generally comparable to or less than that of DC rotary motors. The actuators' latency (the time required to ramp up to full speed) is small enough to allow users to have nearly instantaneous response in interactive applications.

In one embodiment, each of the plurality of oppositely facing, interlaced cantilever beams 105,106 includes a preformed recess 127. Such a preformed recess 127 can be formed by etching some material from each of the plurality of oppositely facing, interlaced cantilever beams 105,106. Alternatively, the preformed recess 127 may be formed by stamping, molding, or bending each of the plurality of oppositely facing, interlaced cantilever beams 105,106. The preformed recess 127 provides a "seat" into which the one or more piezoelectric actuators 119 sit. In one embodiment, the preformed recess 127 is approximately equivalent in depth as each of the piezoelectric actuator's height. However, smaller depths can be used. Where the preformed recess 127 is employed, each of the plurality of oppositely facing, interlaced cantilever beams 105,106 has greater freedom of motion as the one or more piezoelectric actuators 119 sits into its corresponding cantilever beam, thereby reducing the overall height of each beam.

Figure 2:
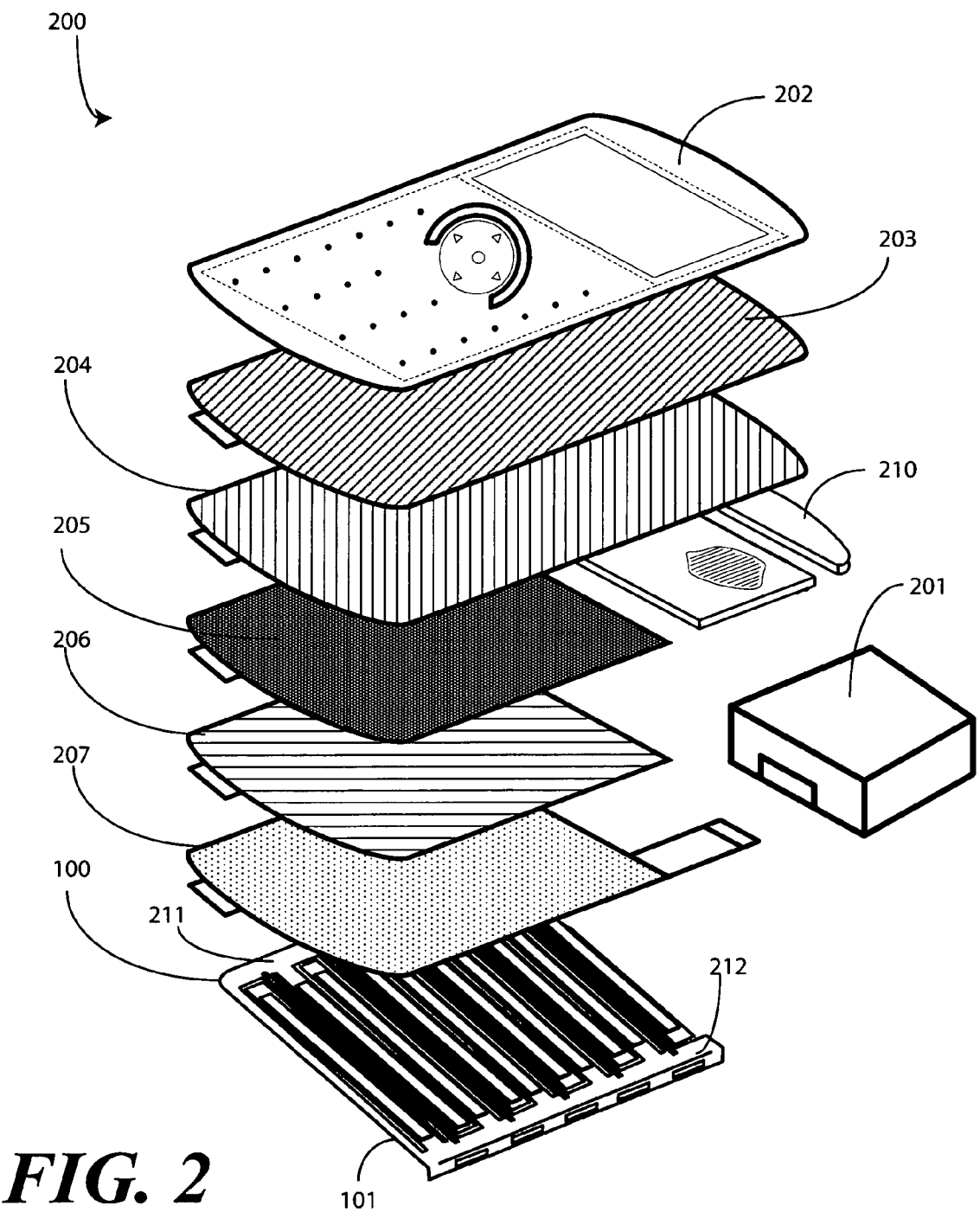
FIG. 2 illustrates an exploded view of one embodiment of a touch sensitive user interface suitable for use with a haptic feedback platform in accordance with the invention.

Turning now to FIG. 2, illustrated therein is an exploded view of one embodiment of a touch sensitive user interface 200 for an electronic device that is suitable for use with embodiments of the haptic feedback layer 100 of the present invention. The exemplary touch sensitive user interface 200 shown in FIG. 2 is that a "morphing" user interface, in that it is configured to dynamically present one of a plurality of mode-based sets of user actuation targets to a user. The morphing touch sensitive user interface 200 is well suited for embodiments of the invention because this user interface 200 is a "touch sensitive" user interface, and can be enhanced by the tactile feedback offered by the haptic feedback layer 100. The touch sensitive user interface 200 is "touch sensitive" in that a capacitive sensor layer 203 detects the presence of a user's finger or stylus.

This touch sensitive user interface 200 is illustrative only, in that it will be obvious to those of ordinary skill in the art having the benefit of this disclosure that any number of various user interfaces could be substituted and used in conjunction with the various embodiments of the haptic feedback layer 100 described herein. For instance, a more traditional user interface, such as one that includes popple-style buttons, could actually be used with the haptic feedback layer 100 as the haptic feedback layer 100 could be configured to provide an active, non-audible alert such as a general vibration alarm or other global Haptic response.

Starting with the top layer of this exemplary touch sensitive user interface 200, a cover layer 202 serves as a continuous fascia and functions as a protective surface. The touch sensitive user interface 200 may further include other elements or layers, such as the capacitive sensor layer 203, a segmented electroluminescent device 205, a resistive switch layer 206, a substrate layer 207, and optional filler materials 210.

The cover layer 202, in one embodiment, is a thin film sheet that serves as a unitary fascia member for the touch sensitive user interface 200. Suitable materials for manufacturing the cover layer 202 include clear or translucent plastic film, such as 0.4 millimeter, clear polycarbonate film. In another embodiment, the cover layer 202 is manufactured from a thin sheet of reinforced glass. The cover layer 202 may include printing or graphics.

The capacitive sensor layer 203 is disposed below the cover layer 202. The capacitive sensor layer 203, which in one embodiment is formed by depositing small capacitive plate electrodes on a substrate, is configured to detect the presence of an object, such as a user's finger or stylus, near to or touching the touch sensitive user interface 200. A controller 201, which is coupled to the capacitive sensor layer 203, detects a change in the capacitance of a particular plate combination on the capacitive sensor layer 203. The capacitive sensor layer 203 may be used in a general mode, for instance to detect the general proximate position of an object. Alternatively, the capacitive sensor layer 203 may also be used in a specific mode where a particular capacitor plate pair may be detected to detect the location of an object along length and width of the touch sensitive user interface 200.

A segmented optical shutter 204 then follows. The segmented optical shutter 204, which in one embodiment is a twisted nematic liquid crystal display, is used for presenting one of a plurality of keypad configurations to a user by selectively opening or closing windows or segments. Electric fields are applied to the segmented optical shutter 204, thereby changing the optical properties of the segments of the optical shutter to hide and reveal various user actuation targets. Additionally, a high-resolution display can be hidden from the user when the device is OFF, yet revealed when the device is ON. The application of the electric field causes the polarity of light passing through the optical shutter to rotate, thereby opening or closing segments or windows.

A segmented electroluminescent device 205 includes segments that operate as individually controllable light elements. These segments of the segmented electroluminescent device 205 may be included to provide a backlighting function. In one embodiment, the segmented electroluminescent device 205 includes a layer of backlight material sandwiched between a transparent substrate bearing transparent electrodes on the top and bottom.

The optional resistive switch layer 206 serves as a force switch array configured to detect contact with any of one of the shutters dynamic keypad region or any of the plurality of actuation targets. When contact is made with the touch sensitive user interface 200, impedance changes of any of the switches may be detected. The array of switches may be any of resistance sensing switches, membrane switches, force-sensing switches such as piezoelectric switches, or other equivalent types of technology.

A substrate layer 207 can be provided to carry the various control circuits and drivers for the layers of the display, or for electrically coupling the various layers with other circuits, such as controller 201. The substrate layer 207, which may be either a rigid layer such as FR4 printed wiring board or a flexible layer such as copper traces printed on a flexible material such as Kapton®, can include electrical components, integrated circuits, processors, and associated circuitry to control the operation of the display.

To provide tactile feedback, in the embodiment of FIG. 2 the haptic feedback layer 100 is disposed beneath the touch sensitive user interface 200. The haptic feedback layer 100, in one embodiment, is coupled to the controller 201. The controller 201, which may be a microprocessor, programmable logic circuit, application specific integrated circuit, or other similar device, provides an electrical signal to the haptic response layer 100.

When the controller 201 detects user contact with the touch sensitive user interface 200, through either the capacitive sensor layer 203 working in the specific mode, through the resistive switch layer 206, or through other means, the controller 201 causes at least one of the one or more piezoelectric actuators (119) to actuate, thereby providing the haptic feedback. In one embodiment, the controller 201 causes the one or more piezoelectric actuators (119) to actuate in pairs. In another embodiment, the controller 201 actuates the one or more piezoelectric actuators (119) such that the cantilever beams emanating out of a first side 211 of the chassis 101 are actuated out of phase with those emanating from a second side 212 of the chassis 101. In another embodiment, the controller 201 actuates the one or more piezoelectric actuators (119) asynchronously so as to provide a predetermined haptic response wave such as a device vibration or other predetermined physical response.

Figure 3:
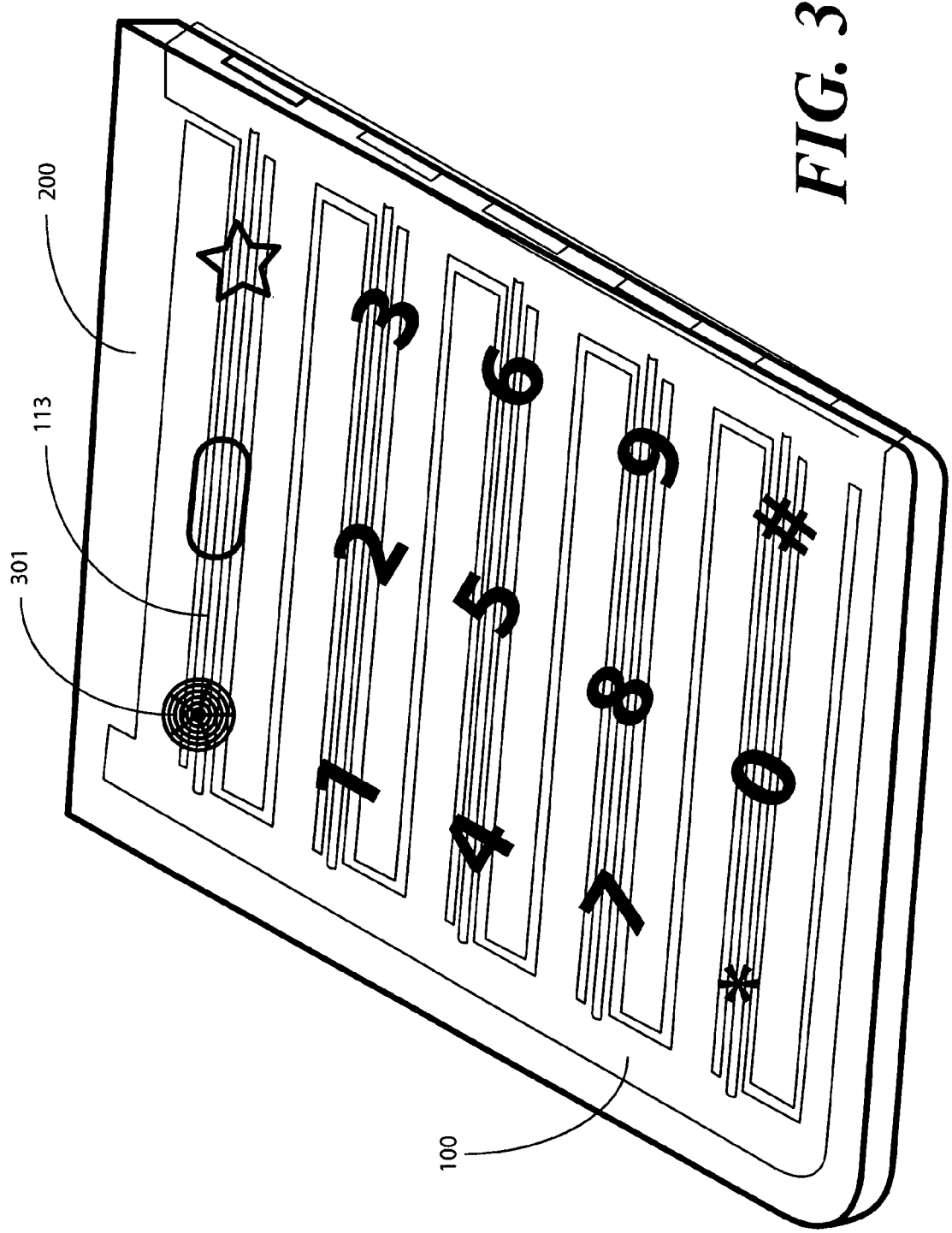
FIG. 3 illustrates a transparent view of a haptic enabled user interface in accordance with embodiments of the invention.

Turning now to FIG. 3, illustrated therein is the haptic feedback layer 100 coupled to the touch sensitive user interface 200 to form a user input for an electronic device. The touch sensitive user interface is shown in a transparent form such that the haptic feedback layer 100 may be seen underneath. In such a configuration, the touch sensitive user interface comprises the capacitive sensor layer (203), the cover layer (202), the haptic feedback layer 100, and electronic circuitry, such as the controller (201) that couples the capacitive sensor layer (203) and the haptic feedback layer 100. This electronic circuitry is configured, in one embodiment, to drive the piezoelectric actuators of the haptic feedback layer in response to an object contacting the touch sensitive user interface (200) as sensed by the capacitive sensor layer (203). Where the touch sensitive user interface (200) is a morphing user interface, the segmented optical shutter (204) configured to present one of a plurality of keypad configurations to a user by transitioning segments of the segmented optical shutter (204) from opaque states to pellucid states may also be included.

Note that the touch sensitive user interface 200, whether morphing or not, will present user actuation targets 301 to be used as user input devices. In one embodiment, to provide greater structural integrity, at least some of the support beams may be placed beneath the actuation targets. For instance, support beam 113 and its corresponding arch is placed beneath user actuation target 301 in the exemplary embodiment of FIG. 3. Such support beams may be placed beneath either columns or rows of user actuation targets, depending upon configuration. As such, the support beam 113 between cantilever beams (105),(106) can serve as a "pinch point", particularly with respect to force resistive materials.

Figure 4:
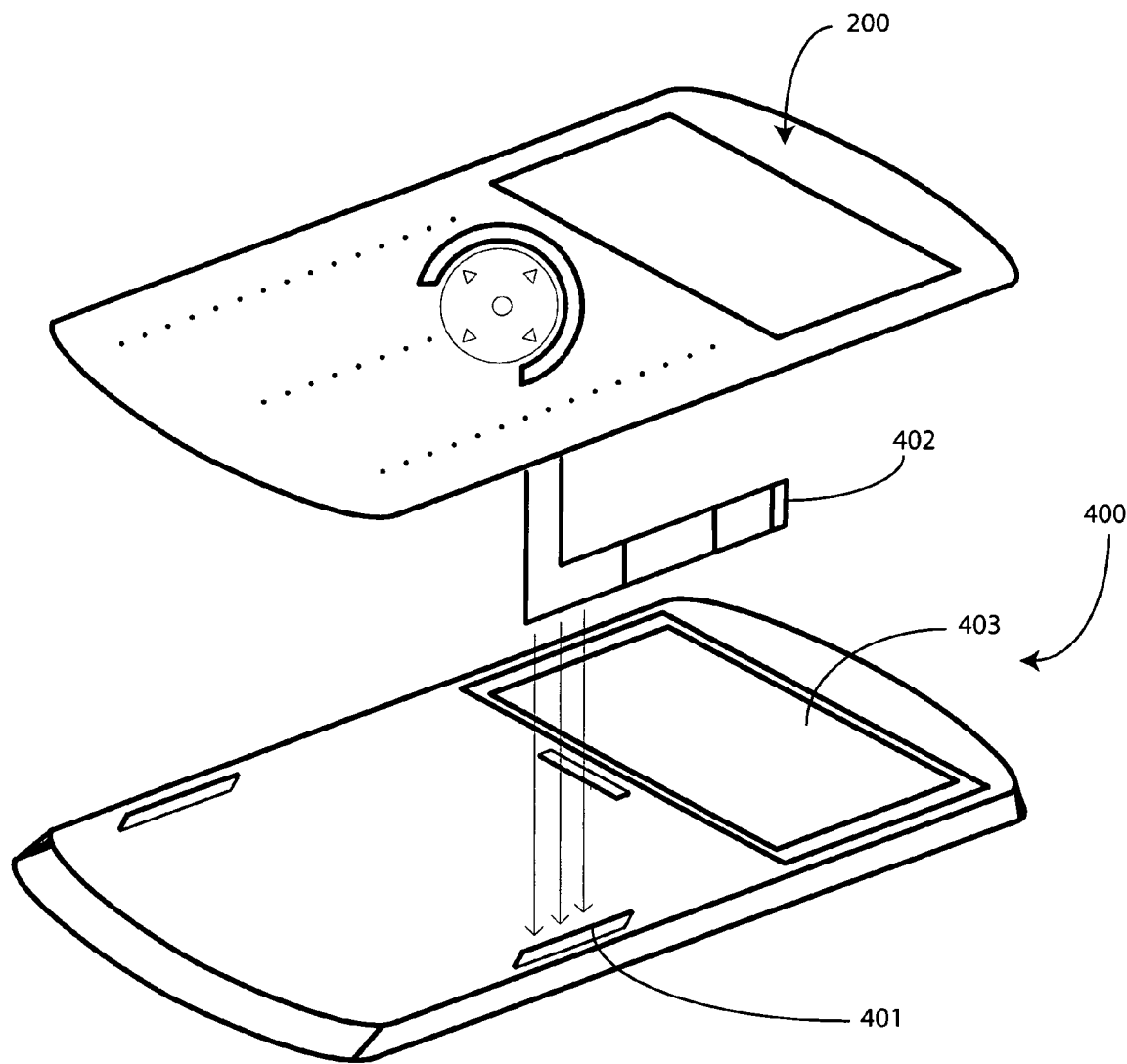
FIG. 4 illustrates an exploded view of an electronic device employing a haptic response system in accordance with embodiments of the invention.

Turning now to FIG. 4, illustrated therein is the touch sensitive user interface 200—having the haptic feedback layer (100) coupled thereto—being coupled to an electronic device body 401 to form the electronic device 400. In this exemplary embodiment, a connector 402 fits within a connector receptacle 403 of the electronic device body 401, thereby permitting an electrical connection between the touch sensitive user interface 200 and the other components and circuits of the portable electronic device 400.

Figure 5:
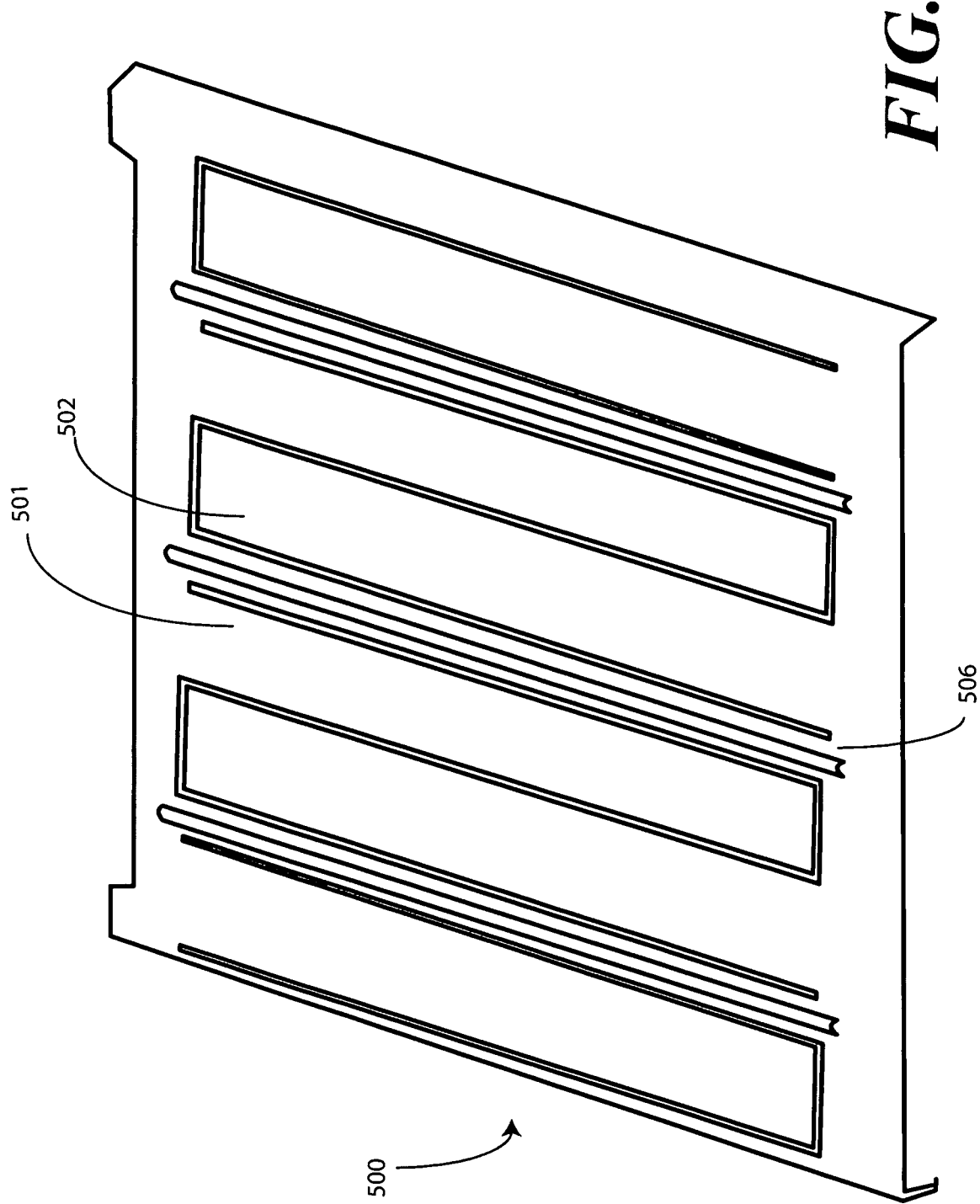
FIG. 5 illustrates one alternate haptic apparatus in accordance with embodiments of the invention.
Figure 6:
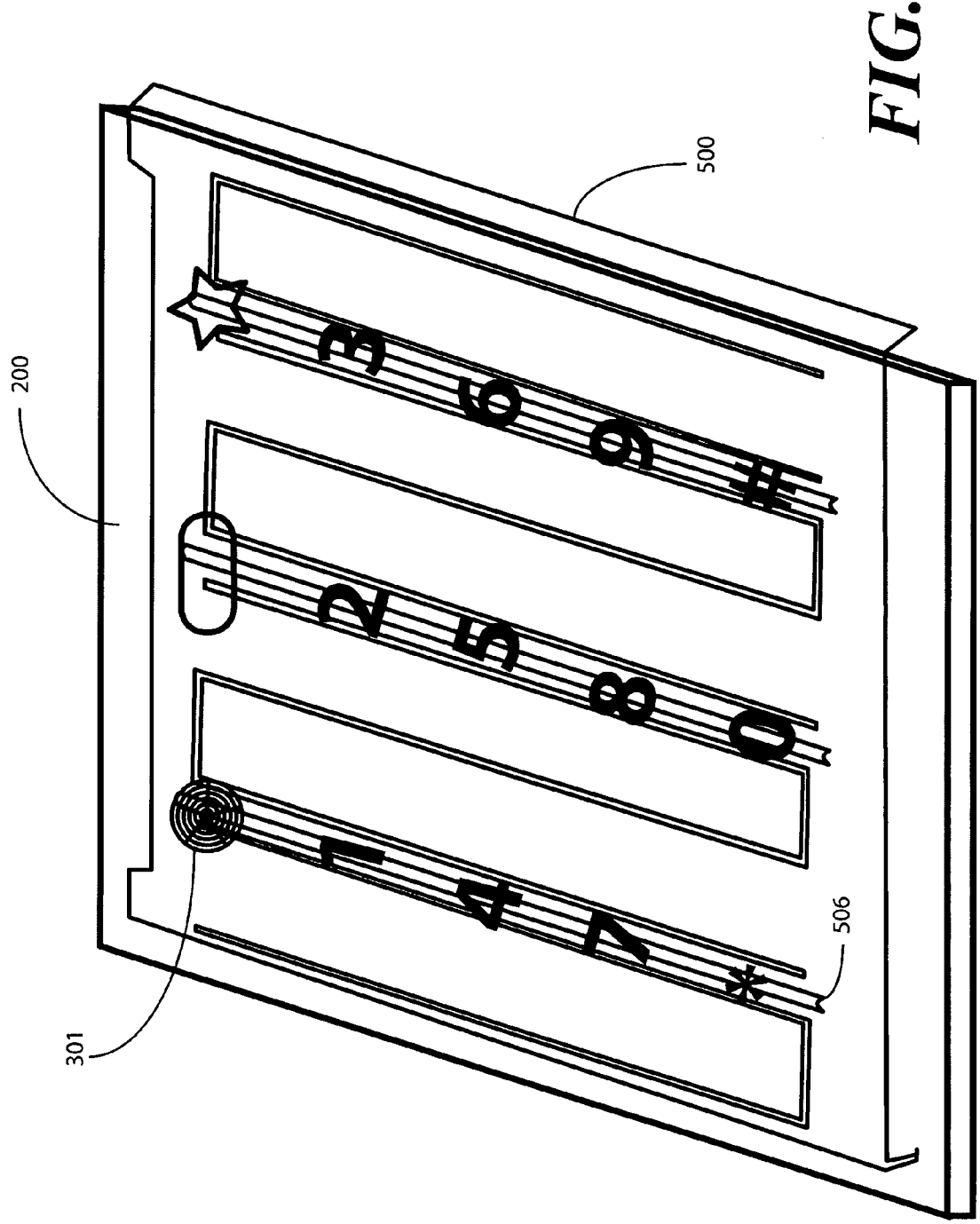
FIG. 6 illustrates a transparent view of an alternate haptic enabled user interface in accordance with embodiments of the invention.

Turning now to FIG. 5, illustrated therein is an alternate embodiment of a haptic feedback layer 500 in accordance with the invention. The haptic feedback layer 500 of FIG. 5 is similar to that of FIG. 1. However, in FIG. 5, the plurality of oppositely facing, interlaced cantilever beams 501,502, as well as the support beams 506 are oriented vertically across the haptic feedback layer. FIG. 6 illustrates such a haptic feedback layer 500 being disposed beneath the touch sensitive user interface 200. In this configuration, the plurality of oppositely facing, interlaced cantilever beams 501,502 span vertically across the touch sensitive user interface 200, with one or more support beams, e.g., support beam 506, passing beneath either a user actuation target (301) or a column of user actuation targets. The support beam 506 between cantilever beams 501,502 can serve as a "pinch point", particularly with respect to force resistive materials.

Figure 7:
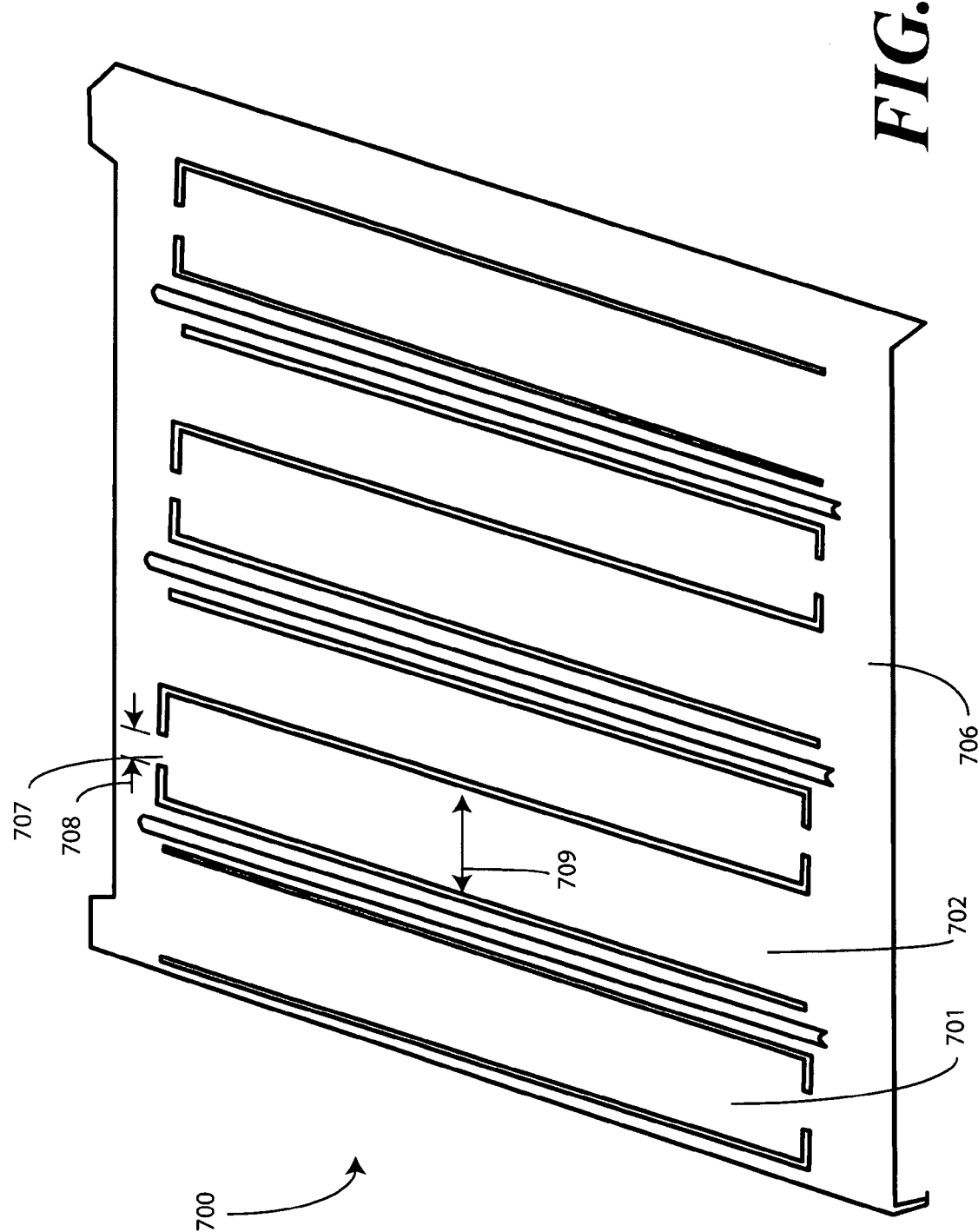
FIG. 7 illustrates one alternate haptic apparatus in accordance with embodiments of the invention.

Turning now to FIG. 7, illustrated therein is an alternate embodiment of a haptic feedback layer 700 in accordance with the invention. The haptic feedback layer 700 of FIG. 7 is similar to that shown in FIG. 5. However, each of the plurality of oppositely facing, interlaced cantilever beams 701,702 emanate from the chassis 706 at a first end, and is coupled to the chassis at a distal end by a coupling member, e.g., coupling member 707. The coupling member 707 can assist with dampening in certain applications. Further, the coupling member 707 facilitates increased cantilever beam "flatness retention" during the chassis manufacturing process. In the exemplary embodiment of FIG. 7, the coupling member has a width 708 that is shorter than the cantilever beam width 709. This configuration is referred to as a "pseudo-constrained" configuration in that the beams are tied at two points to the chassis 706.

Figure 8:
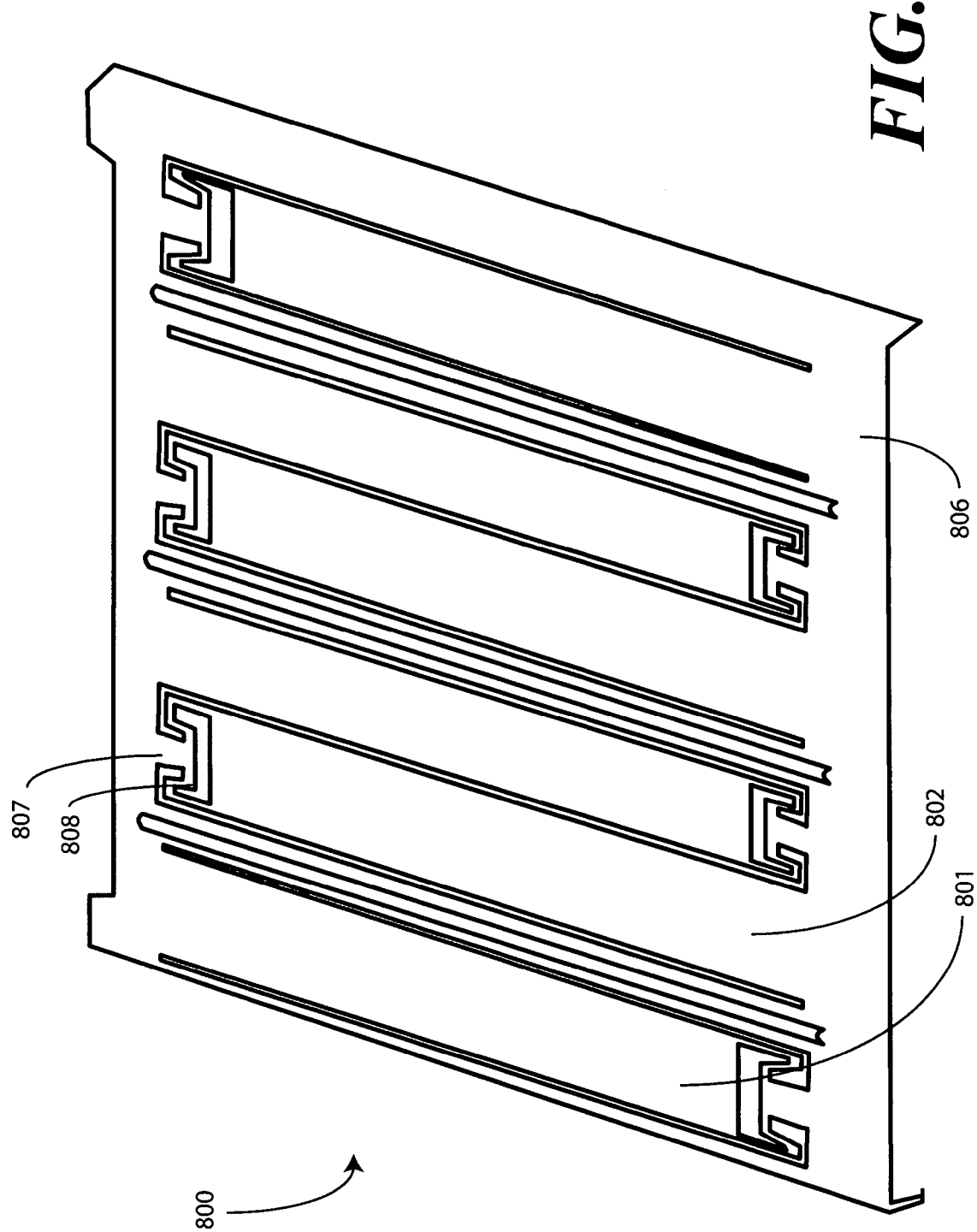
FIG. 8 illustrates one alternate haptic apparatus in accordance with embodiments of the invention.

Turning now to FIG. 8, illustrated therein is yet another embodiment of a haptic feedback layer 800 in accordance with the invention. As with the other embodiments, the haptic feedback layer 800 includes plurality of oppositely facing, interlaced cantilever beams 801,802. As with the embodiment of FIG. 7, each of the plurality of oppositely facing, interlaced cantilever beams 801,802 is coupled to the chassis 806 with a coupling member, e.g., coupling member 807. However, in the embodiment of FIG. 8, the coupling member 807 comprises a U-shaped aperture 808. Such an aperture 808 can be shaped to tune and alter the cantilever action of each of the plurality of oppositely facing, interlaced cantilever beams 801,802.

Figure 9:
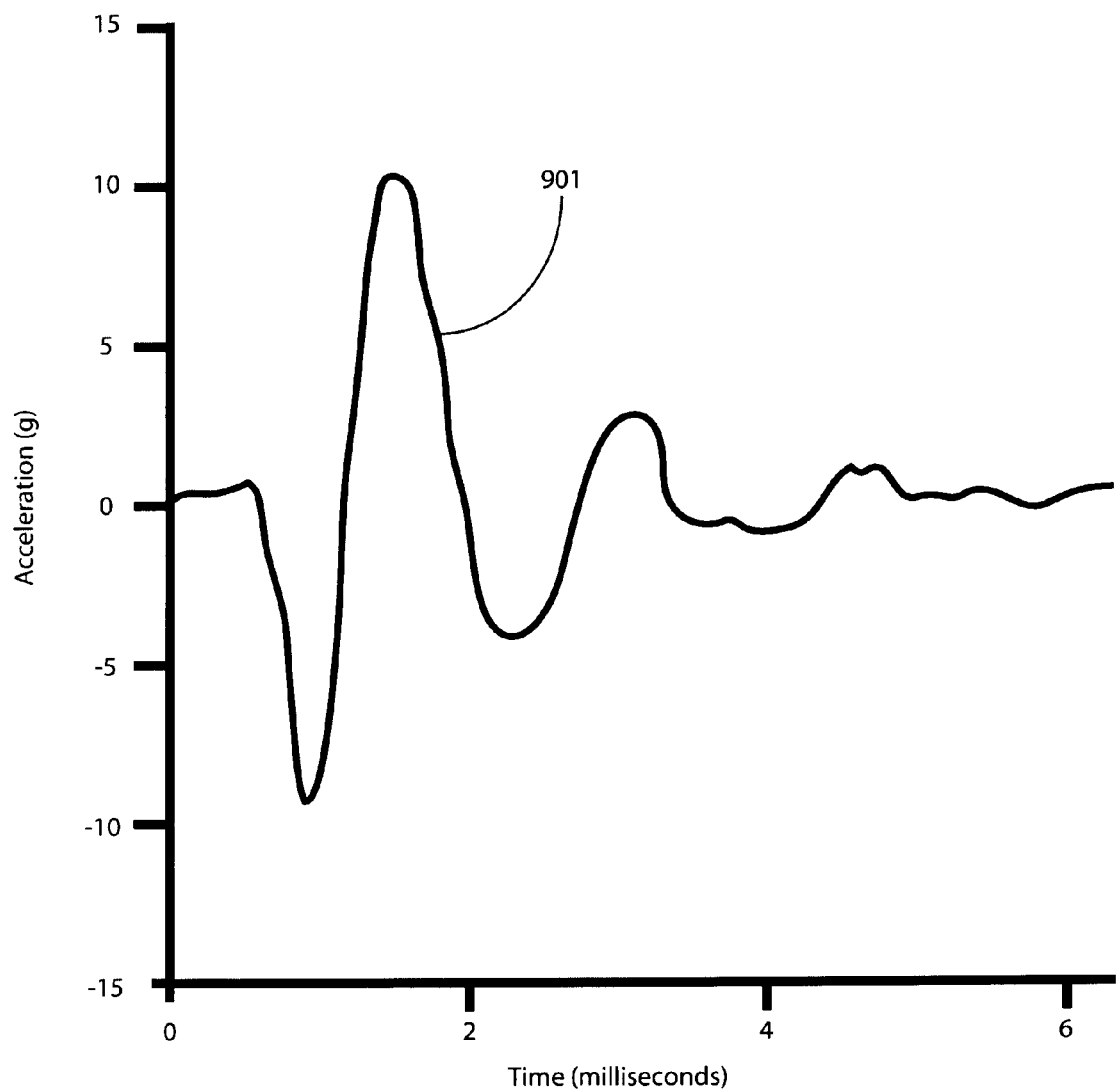
FIG. 9 is a graph illustrating one response of a piezoelectric actuator in accordance with embodiments of the invention.

Turning now to FIG. 9, illustrated therein is an exemplary control signal for driving piezoelectric actuators so as to provide a popple button sensation feedback. A characterisic of the acceleration profile 901 is high peak acceleration, 1~100 g, in a relatively short time period (<10 ms). The high frequency component in the acceleration curve associates with sound accompanying the tactile click feel.

Embodiments of the invention, as described herein, provide a user interface system that produces an intense haptic response that is substantially uniform throughout its output region. The plurality of cantilever beams work to "average" the piezoelectric impulse induced within the chassis by combining it with a similar one from an opposing orientation. The support beams, where used, can provide additional strength and rigidity to the overall system for modest loads without dampening out the displacement effects of the cantilevers beams. Furthermore, the use of opposing cantilever beams provides a degree of system redundancy in the event that one of the piezoelectric actuators becomes damaged.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A user input for electronic device, comprising:
   a touch sensitive user interface having a continuous fascia and one or more sub-layers;
   a controller coupled to the touch sensitive user interface, and configured to detect user contact with the touch sensitive user interface;
   a haptic feedback layer coupled to the controller and disposed beneath the touch sensitive user interface, the haptic feedback layer comprising:
      a chassis defining a perimeter of the haptic feedback layer;
      a plurality of oppositely facing, interlaced cantilever beams emanating from the chassis and spanning across at least a portion of the haptic feedback layer; and
      one or more piezoelectric actuators, responsive to the controller and coupled to the plurality of oppositely facing, interlaced cantilever beams;
   wherein when the controller detects the user contact, the controller causes at least one of the one or more piezoelectric actuators to actuate.

2. The user input of claim 1, wherein the plurality of oppositely facing, interlaced cantilever beams span horizontally across the touch sensitive user interface.

3. The user input of claim 1, wherein the plurality of oppositely facing, interlaced cantilever beams span vertically across the touch sensitive user interface.

4. The user input of claim 1, wherein the chassis further comprises one or more support beams spanning the chassis, wherein the plurality of oppositely facing, interlaced cantilever beams are grouped in beam pairs such that each beam pair is separated by one of the one or more support beams.

5. The user input of claim 4, wherein each of the one or more support beams comprises a reinforcing shape across at least a subsection of its cross section.

6. The user input of claim 5, wherein the reinforcing shape comprises an arch, wherein the arch rises at least twice a height of one of the one or more piezoelectric actuators.

7. The user input of claim 5, wherein the touch sensitive user interface comprises a plurality of user actuation targets, wherein the reinforcing shape is disposed below one of a row or a column of the plurality of user actuation targets.

8. The user input of claim 1, wherein each of the plurality of oppositely facing, interlaced cantilever beams emanates from the chassis at a first end, further wherein each of the plurality oppositely facing, interlaced cantilever beams is coupled to the chassis at a distal end by a coupling member.

9. The user input of claim 8, wherein each of the plurality of oppositely facing, interlaced cantilever beams has a beam width, further wherein each coupling member has a member width, wherein the member width is less than the beam width.

10. The user input of claim 8, wherein each coupling member comprises a U-shaped aperture.

11. The user input of claim 1, wherein each of the plurality of oppositely facing, interlaced cantilever beams comprises a preformed recess, wherein one of the one or more piezoelectric actuators is disposed in the preformed recess.

12. The user input of claim 1, wherein the controller causes the one or more piezoelectric actuators to actuate in pairs.

13. The user input of claim 1, wherein the touch sensitive user interface comprises a morphing user interface.

14. The user input of claim 1, wherein the controller causes the one or more piezoelectric actuators to actuate in accordance with an actuation signal configured to provide a popple button sensation tactile feedback.

15. The user input of claim 1, wherein a first set of cantilever beams emanating from a first side of the chassis actuate out of phase with a second set of cantilever beams emanating from a second side of the chassis.

16. The user input of claim 1, wherein when the controller detects the user contact, the controller causes the one or more piezoelectric actuators to actuate asynchronously so as to provide a predetermined haptic response wave.

17. A portable electronic communication device having a user interface comprising:
   a capacitive touch sensor;
   a haptic feedback layer disposed beneath the capacitive touch sensor, the haptic feedback layer comprising:
      a chassis defining a perimeter of the haptic feedback layer;
      a plurality of oppositely facing, interlaced cantilever beams emanating from the chassis and spanning across at least a portion of the haptic feedback layer; and one or more piezoelectric actuators coupled to the plurality of oppositely facing, interlaced cantilever beams;

electronic circuitry coupling the capacitive touch sensor and the haptic feedback layer, the electronic circuitry being configured to drive the one or more piezoelectric actuators in response to an object contacting the user interface.

18. The portable electronic communication device of claim 17, wherein the user interface further comprises a continuous fascia and a segmented optical shutter configured to present one of a plurality of keypad configurations by transitioning segments of the segmented optical shutter from opaque states to pellucid states.

19. The portable electronic communication device of claim 18, wherein each of the plurality of keypad configurations comprises a plurality of actuation targets, wherein when the capacitive touch sensor detects contact with an particular actuation target, the electronic circuitry is configured to drive a pair of piezoelectric actuators disposed beneath the particular actuation target.

20. The portable electronic communication device of claim 17, wherein the chassis further comprises one or more support beams spanning the chassis, wherein each pair of oppositely facing, interlaced cantilever beams are separated by one of the one or more support beams.

* * * * *